March 18, 1952  C. H. ROSE  2,590,040
VEHICLE GUIDING MEANS
Filed March 21, 1949
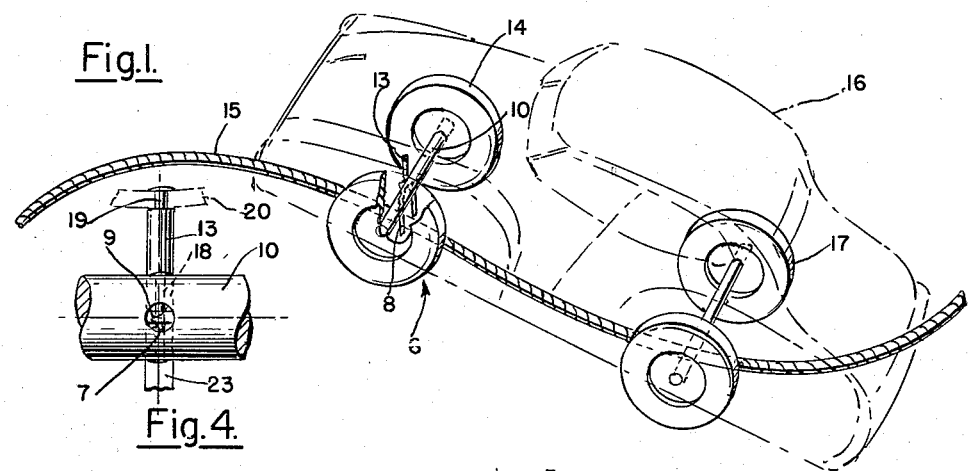
Fig.1.
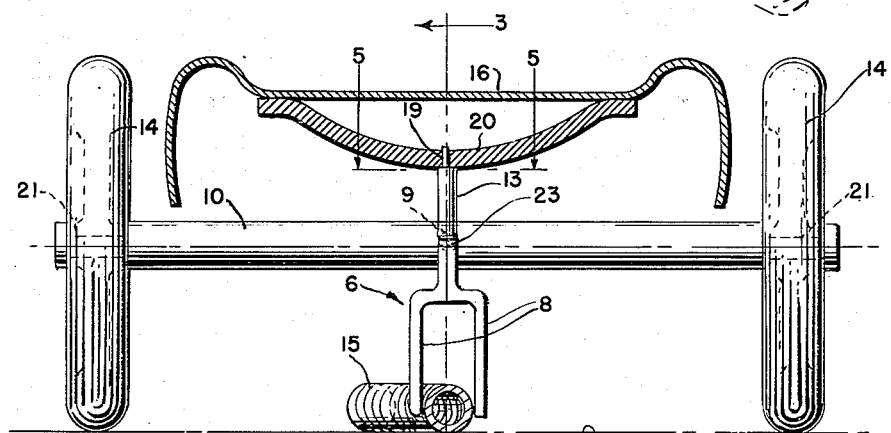
Fig.4.
Fig.2.
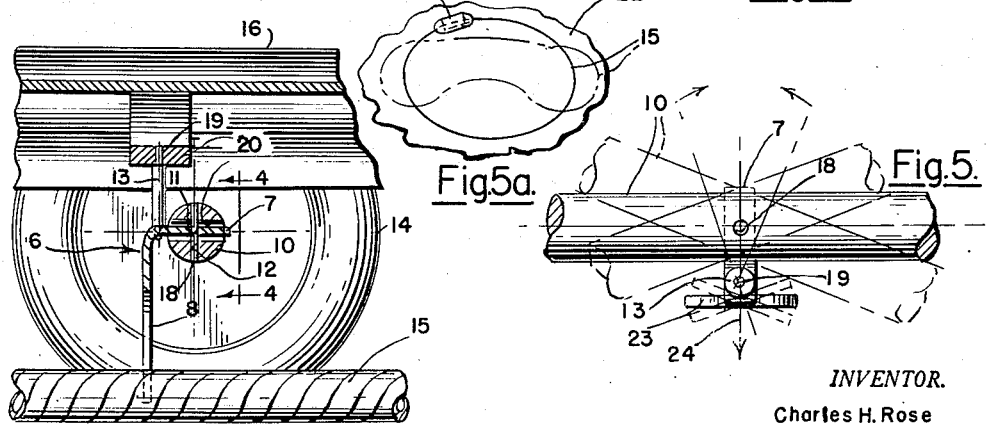
Fig.3.  Fig.5a.  Fig.5.
INVENTOR.
Charles H. Rose
BY
Attorney Patented Mar. 18, 1952

2,590,040

UNITED STATES PATENT OFFICE 2,590,040

VEHICLE GUIDING MEANS

Charles H. Rose, Chicago, Ill.

Application March 21, 1949, Serial No. 82,638

1 Claim. (Cl. 104—248)

My invention relates to vehicle guiding means, and bears particular relation to use in connection with toy vehicles, such as toy automobiles, trucks and the like.

A most important object of my invention is to provide vehicle guiding means, centrally attached to the front axle in association with a flexible cable, to guide the vehicle by steering the front wheels thereof in the path of the flexible cable, which may be arranged along a floor, table top or the like, in a straight, curving or irregular line.

A further important object of my invention is to provide vehicle guiding means wherein the front axle of the vehicle is eccentrically mounted by a pivot post slightly in advance thereof, thus imparting a trailer-like action to the said front wheels, causing the vehicle to travel in a straight line when not guided by a flexible cable or other guiding means.

A further important object of my invention is to provide vehicle guiding means of the above described character which is adaptable not only to toy vehicles but to any size or type of vehicle that must follow a certain path, such as coal cars in mine tunnels.

A still further object of my invention is to provide vehicle guiding means in which the fork element projects slightly forward of the front axle to act in association with a flexible cable, as a steering means for the said vehicle.

A further object of my invention is to provide vehicle guiding means of simple design and construction that is adaptable to any four-wheeled, steerable vehicle, and that may be economically produced in large quantities.

Other objects and advantages inherent in my invention will be disclosed in the following description and the accompanying illustrations, in which like parts are referred to by like numerals, and in which;

Fig. 1 is a perspective view of a toy automobile drawn in phantom lines with my invention attached to the front axle thereof, and shown in association with a length of flexible cable bent to the shape of the letter S.

Fig. 2 is a front view of the front axle and wheels of a vehicle showing my invention attached thereto in association with a section of flexible cable.

Fig. 3 is a cross-sectional view of my invention taken substantially on line 3—3 on Fig. 2, shown mounted on the front axle, and shown in connection with a length of flexible cable.

Fig. 4 is an enlarged, fragmentary view of the connecting means between the fork element of my invention and the front axle, taken looking in the direction of arrows 4—4 on Fig. 3.

Fig. 5 is an enlarged, fragmentary, top view of my vehicle guiding means shown without the flexible cable, and showing in phantom lines the tendency for the eccentric pivot post to guide the front axle and wheels in a straight, forward line.

Fig. 5a is a schematic diagram showing a toy vehicle having my vehicle guiding means attached thereto in association with an oval shaped flexible cable.

Referring to the illustrations, my invention is generally designated 6, and consists of a fork element 23, formed preferably from steel plate and having a bent handle portion 7, which projects through a horizontal drilled hole 9 in the front axle 10 of the vehicle 16. The said front axle 10 is shown with wheels 14 mounted on reduced bearing portions 21 thereof. Vertical pin holes 11 and 12 are drilled centrally in axle 10 and through bent handle portion 7 to permit a fork attaching pin 18 to be inserted therethrough. An eccentric pivot post 13 is fixed vertically on handle portion 7 in advance of axle 10 and is pivotably attached to front axle attaching portion 20 of vehicle 16 by reduced extension 19.

The body 16 has holes through which the rear axle is mounted thus affording support to the said body 16 at its rear. Under the hood of the vehicle body 16 the front axle attaching portion 20 is secured by soldering or other suitable means to the inner side walls of the hood of the body 16. Thus the portion 20 supports the body 16 on the front wheels 14 through the agency of the fork element 23, whereas the rear wheels support the body by virtue of the holes in which its rear wheel axle is mounted.

In operation in association with a flexible cable 15, the prong portions 8 of fork element 23 are placed astride the said flexible cable 15, which rests upon a smooth surface such as a floor or table top 22. The said flexible cable 15 may be laid upon a floor or table top 22 in an irregular, straight or curved line, and by guiding fork element 23, causes the front wheels 14 to be steered together with vehicle 16 and rear wheels 17 along the path of the flexible cable 15.

Referring to Fig. 3, it will be observed that fork element 23 need project only a very short distance in front of axle 10, to function in connection with flexible cable 15 as a steering guide, imparting a trailer-like action to all four wheels of the vehicle 16. The pivotable connection between eccentric pivot post 13 and vehicle 16 maintains fork element 23 in a vertical position at all times. The eccentric pivot post 13 being mounted slightly in advance of axle 10 has the effect, in association with wheels 14, of imparting a trailer-like action thereto, causing the vehicle 16 to travel in a straight line when no flexible cable or other guiding means is used in connection therewith. In other words, having front wheels 14, together with axle 10, pivoted on the eccentric pivot post 13, the tendency for the vehicle 16 would be to travel in a straight line as shown by the arrow 24 in Fig. 5, when no flexible cable or other guide means is used.

The mounting of the front axle in eccentric or offset relationship with respect to the fork attaching pin 18 will cause the vehicle to travel forwardly in a straight line when either pushed or pulled. Any movement imparted to the body 16 will be transmitted through the pivot pin 13 which in turn will exert an even pull on each of the wheels 14 thus resulting in straight line movement of the vehicle in a forward direction.

A particular feature of my invention is that by virtue of its construction, the steering wheels always travel in parallel and equidistant relationship with respect to the guiding cable.

Important advantages in connection with my invention reside in the fact that four-wheeled vehicles, such as toy automobiles and the like, having my vehicle guiding means used in connection with the front axle thereof, may be caused to travel in a straight line without any guiding means or may be used in connection with a flexible cable means which may be laid in an irregular, straight or curved line to guide vehicles through the association with my vehicle guiding means.

Although my invention has been described, the terms used are to deemed terms of description rather than terms of limitation, my intention being to retain the right to all mechanical equivalents of the structural elements depicted, provided they fall within the purview of the appended claim.

Having thus disclosed and revealed my invention, what I claim as new and desire to secure by Letters Patent is:

A road type of vehicle having front and rear wheels mounted on axles, the front axle being pivotally mounted about a vertical axis to the underframe of the said vehicle at a point forwardly of the said front axle, and a fork member secured to the said front axle extending downwardly and forwardly therefrom for cooperation with rail guide means to define its orbit of operation.

CHARLES H. ROSE.

REFERENCES CITED

The following references are of record in the file of this patent:

UNITED STATES PATENTS

| Number | Name | Date |
|---|---|---|
| 486,304 | Takken | Nov. 15, 1892 |
| 924,182 | Neville | June 8, 1909 |
| 933,914 | Neville | Sept. 14, 1909 |
| 2,005,910 | Andersen | June 25, 1935 |
| 2,125,590 | Smallwood | Aug. 2, 1938 |
| 2,196,257 | Dubilier | Apr. 9, 1940 |